(12) United States Patent
Lee et al.

(10) Patent No.: US 11,588,357 B2
(45) Date of Patent: Feb. 21, 2023

(54) ELECTRONIC DEVICE FOR DISPLAYING ALIGNMENT STATE FOR WIRELESS CHARGING

(71) Applicant: Samsung Electronics Co., Ltd., Gyeonggi-do (KR)

(72) Inventors: June Lee, Gyeonggi-do (KR); Junhui Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 75 days.

(21) Appl. No.: 17/183,569

(22) Filed: Feb. 24, 2021

(65) Prior Publication Data

US 2021/0273498 A1 Sep. 2, 2021

(30) Foreign Application Priority Data

Mar. 2, 2020 (KR) .................. 10-2020-0026048

(51) Int. Cl.
*H02J 50/90* (2016.01)
*H02J 7/00* (2006.01)
(Continued)

(52) U.S. Cl.
CPC ............ *H02J 50/90* (2016.02); *H02J 7/0047* (2013.01); *H02J 50/10* (2016.02); *G06F 1/163* (2013.01); *H02J 2310/22* (2020.01)

(58) Field of Classification Search
CPC ....................................................... H02J 50/90
(Continued)

(56) References Cited

U.S. PATENT DOCUMENTS 9,627,130 B2  4/2017 Golko et al.
10,263,340 B2  4/2019 Noori et al.
(Continued)

FOREIGN PATENT DOCUMENTS

KR  10-2016-0138909 A  12/2016
KR  10-2017-0020144 A  2/2017
(Continued)

OTHER PUBLICATIONS

International Search Report dated Jun. 16, 2021.

*Primary Examiner* — Edward Tso
*Assistant Examiner* — Ahmed H Omar
(74) *Attorney, Agent, or Firm* — Cha & Reiter, LLC

(57) ABSTRACT

An electronic device is disclosed, including a magnetic member, a position sensor configured to detect a change in a magnetic force of the magnetic member, a display, and a processor. The processor is configured to: when the magnetic member approaches an external electronic device, detect the change in the magnetic force of the magnetic member through the position sensor, and based on the detected change, display, on the display, a graphic indicating a direction in which the magnetic member is to be moved to align the electronic device with an external device for wireless charging. Another electronic device is disclosed, including an RF coil, a shielding sheet having at least two portions with two divergent magnetic permeabilities, and a processor configured to: control the RF coil to generate the wireless charging signal and transmit the wireless charging signal, wherein a magnetic member included in an external electronic device is changed in magnetic force values when approaching the at least two portions.

14 Claims, 8 Drawing Sheets

(51) Int. Cl.
*H02J 50/10* (2016.01)
*G06F 1/16* (2006.01)

(58) Field of Classification Search
USPC .......................................... 320/108
See application file for complete search history.

(56) References Cited

U.S. PATENT DOCUMENTS

| | | |
|---|---|---|
| 10,340,723 B2 | 7/2019 | Jung et al. |
| 10,404,089 B2 | 9/2019 | Kasar et al. |
| 10,475,571 B2 | 11/2019 | Jang |
| 10,505,386 B2 | 12/2019 | Kasar et al. |
| 2011/0115433 A1 | 5/2011 | Lee et al. |
| 2015/0022194 A1* | 1/2015 | Almalki .................. H02J 50/90 324/244 |
| 2016/0094076 A1 | 3/2016 | Kasar et al. |
| 2016/0344224 A1 | 11/2016 | Hong |
| 2017/0117754 A1 | 4/2017 | Noori et al. |
| 2020/0021126 A1 | 1/2020 | Seo et al. |

FOREIGN PATENT DOCUMENTS

| | | |
|---|---|---|
| KR | 10-2018-0038159 A | 4/2018 |
| WO | 2015/148473 A1 | 10/2015 |
| WO | WO-2020230194 A1 * | 11/2020 |

\* cited by examiner

ELECTRONIC DEVICE FOR DISPLAYING ALIGNMENT STATE FOR WIRELESS CHARGING

CROSS-REFERENCE TO RELATED APPLICATION(S)

This application is based on and claims priority under 35 U.S.C. § 119 to Korean Patent Application No. 10-2020-0026048, filed on Mar. 2, 2020, in the Korean Intellectual Property Office, the disclosure of which is incorporated by reference herein its entirety.

BACKGROUND

1. Field

The disclosure relates to a wireless charging technology.

2. Description of Related Art

Recently, with the technological development of digital technologies, a diversity of electronic devices have entered into common usage, such as mobile communication terminals, smart phones, tablet personal computers (PC), personal digital assistants (PDA), electronic organizers, notebook computers, wearable devices, and the like. These electronic devices have an advantage in portability, and allow for continuous use by the user as they are carried around on the user's persons. Each of the electronic devices may include a battery. The battery may be charged through a wired connector connected to the electronic device. In recent years, technology for wirelessly supplying power from a power transmitting device to the electronic device without a physical connection have become more widespread. This allows for wireless charging of many retail devices, such as smartphones and other types of portable terminals, using wireless charging devices.

The above information is presented as background information only to assist with an understanding of the disclosure. No determination has been made, and no assertion is made, as to whether any of the above might be applicable as prior art with regard to the disclosure.

SUMMARY

An electronic device may perform wireless charging with an external electronic device. During the wireless charging, a charging coil of the electronic device and a charging coil of the external electronic device utilize proper alignment with one another to initiate wireless charging. When the charging coil of the electronic device and the charging coil of the external electronic device are not appropriately aligned, charging efficiency may be degraded, charging time may be increased, and/or excess heat may be generated in the electronic device.

Aspects of the disclosure are to address at least the above-mentioned problems and/or disadvantages and to provide at least the advantages described below. Accordingly, an aspect of the disclosure is to provide an electronic device for displaying a movement direction in which the electronic device is to move for wireless charging alignment when performing wireless charging with an external electronic device.

In accordance with an aspect of the disclosure, an electronic device for performing wireless charging with an external electronic device includes a magnetic member, a position sensor configured to detect a change in a magnetic force of the magnetic member, a display, and a processor operatively connected with the position sensor and the display, the processor configured to: when the magnetic member approaches an external electronic device, detect the change in the magnetic force of the magnetic member through the position sensor, and based on the detected change, display, on the display, a graphic indicating a direction in which the magnetic member is to be moved to align the electronic device with an external device for wireless charging.

In accordance with another aspect of the disclosure, an electronic device for wirelessly transmitting power to an external electronic device through a wireless charging signal includes an RF coil configured to transmit a wireless charging signal, a shielding sheet disposed on one surface of the RF coil, a processor configured to: control the RF coil to generate the wireless charging signal and transmit the wireless charging signal, wherein the shielding sheet includes at least two portions having different magnetic permeabilities, wherein a magnetic member included in an external electronic device is changed in magnetic force values when approaching the at least two portions.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

In the following description made with respect to the accompanying drawings, similar components will be assigned with similar reference numerals.

DETAILED DESCRIPTION

Hereinafter, certain embodiments of the disclosure may be described with reference to accompanying drawings. Accordingly, those of ordinary skill in the art will recognize that modification, equivalent, and/or alternative on the certain embodiments described herein can be variously made without departing from the disclosure.

Figure 1:
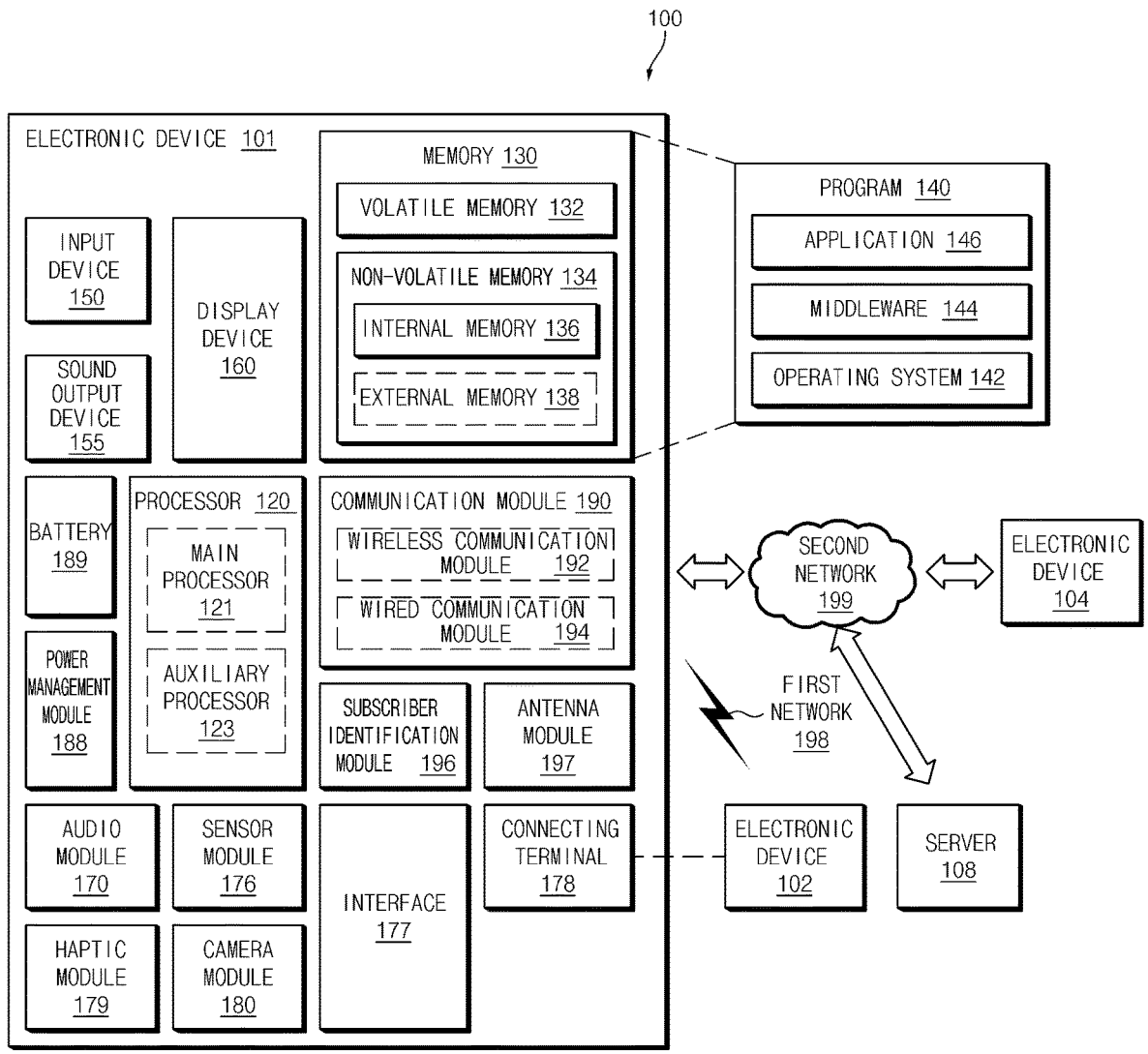
FIG. 1 is a block diagram illustrating an electronic device in a network environment according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator. The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
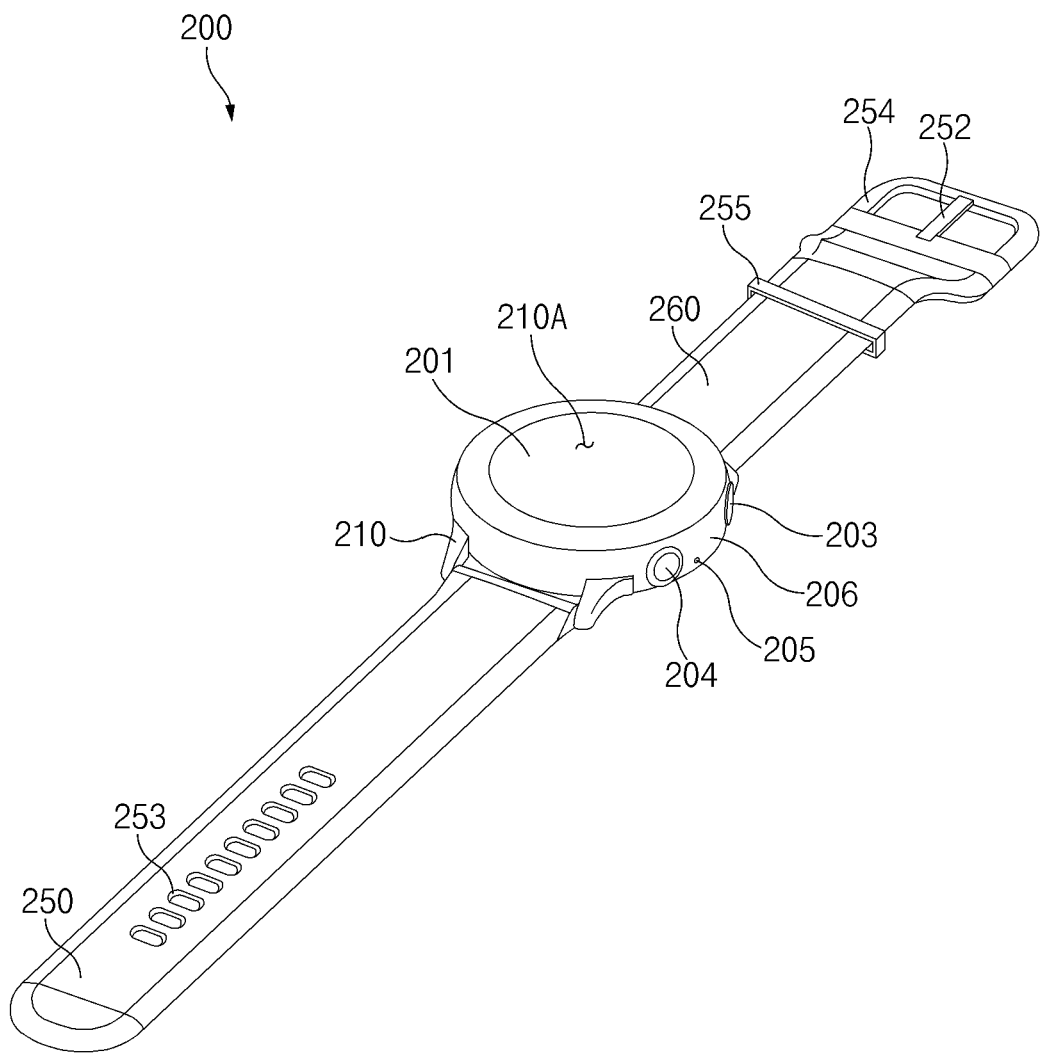
FIG. 2A is a front perspective view of an electronic device according to an embodiment.
Figure 2B:
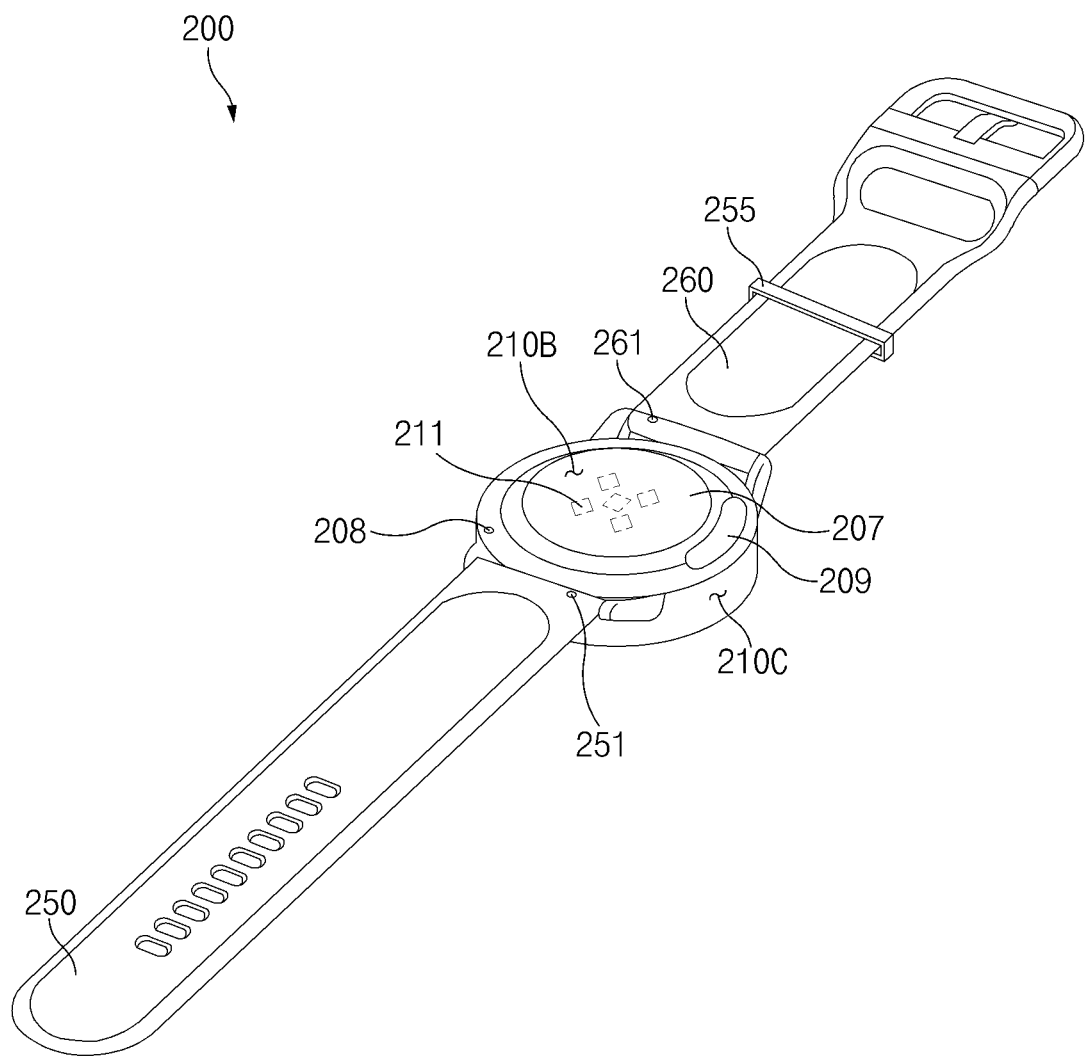
FIG. 2B is a rear perspective view of the electronic device of FIG. 2A.
Figure 3:
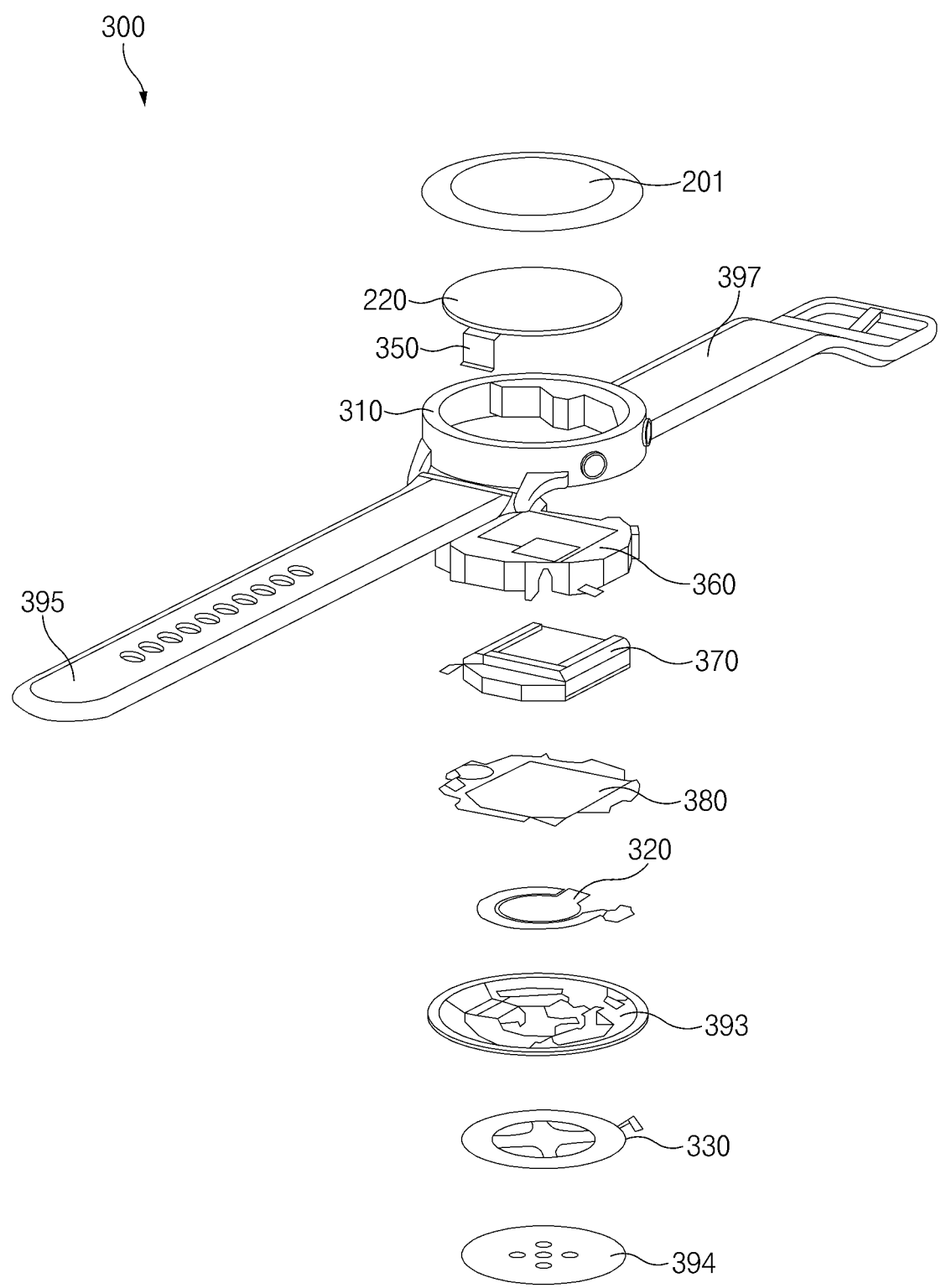
FIG. 3 is an exploded perspective view of the electronic device of FIG. 2A.

FIG. 2A is a front perspective view of an electronic device according to an embodiment. FIG. 2B is a rear perspective view of the electronic device of FIG. 2A. FIG. 3 is an exploded perspective view of the electronic device of FIG. 2A.

Referring to FIGS. 2A and 2B, the electronic device 200 (e.g., the electronic device 101) may include a housing 210 that includes a first surface (or, a front surface) 210A, a second surface (or, a rear surface) 210B, and a side surface 210C surrounding a space between the first surface 210A and the second surface 210B, and fastening members 250 and 260 that are connected to at least parts of the housing 210 and that detachably fasten the electronic device 200 around a part (e.g., a wrist, an ankle, or the like) of a user's body. In another embodiment (not illustrated), a housing may refer to a structure that forms some of the first surface 210A, the second surface 210B, and the side surface 210C of FIG. 2A. According to an embodiment, the first surface 210A may be formed by a front plate 201, at least part of which is substantially transparent (e.g., a glass plate including various coating layers, or a polymer plate). The second surface 210B may be formed by a back plate 207 that is substantially opaque. The back plate 207 may be formed of, for example, coated or colored glass, ceramic, polymer, metal (e.g., aluminum, stainless steel (STS), or magnesium), or a combination of at least two thereof. The side surface 210C may be formed by a side bezel structure (or, a "side member") 206 that is coupled with the front plate 201 and the back plate 207 and that includes metal and/or polymer. In some embodiments, the back plate 207 and the side bezel structure 206 may be integrally formed with each other and may be formed of the same material (e.g., a metallic material such as aluminum). The fastening members 250 and 260 may be formed of various materials and may have various forms. The fastening members 250 and 260 may be formed of woven fabric, leather, rubber, urethane, metal, ceramic, or a combination of at least two of the aforementioned materials. The fastening members 250 and 260 may be implemented in an integrated form or with a plurality of unit links that are movable relative to each other.

According to an embodiment, the electronic device 200 may include at least one of a display 220 (refer to FIG. 3), audio modules (e.g., connected to the microphone and speaker holes 205 and 208), a sensor module 211, key input devices 203 and 204, or a connector hole 209. In some embodiments, the electronic device 200 may omit at least one component (e.g., the key input devices 203, and 204, the connector hole 209, or the sensor module 211) among the aforementioned components, or may additionally include other component(s).

According to an embodiment, the display 220, for example, may be visually exposed through most of the front plate 201. The display 220 may have a shape corresponding to the shape of the front plate 201. The display 220 may have various shapes such as a circular shape, an oval shape, a polygonal shape, and the like. The display 220 may be combined with, or disposed adjacent to, touch detection circuitry, a pressure sensor capable of measuring the intensity (pressure) of a touch, and/or a fingerprint sensor.

According to an embodiment, the audio modules may include the microphone hole 205 and the speaker hole 208. A microphone for obtaining a sound from the outside may be disposed in the microphone hole 205, and in some embodiments, a plurality of microphones may be disposed in the microphone hole 205 to detect the direction of a sound. The speaker hole 208 may be used for an external speaker and a call receiver. In some embodiments, the speaker hole 208 and the microphone hole 205 may be implemented with a single hole, or a speaker (e.g., a piezo speaker) may be included without the speaker hole 208.

According to an embodiment, the sensor module 211 may generate an electrical signal or a data value that corresponds to an operational state inside the electronic device 200 or an environmental state external to the electronic device 200. The sensor module 211 may include, for example, a biosensor module (e.g., an HRM sensor) that is disposed on the second surface 210B of the housing 210. The electronic device 200 may further include a non-illustrated sensor module, which may be, for example, at least one of a gesture sensor, a gyro sensor, an atmospheric pressure sensor, a magnetic sensor, an acceleration sensor, a grip sensor, a color sensor, an infrared (IR) sensor, a biosensor, a temperature sensor, a humidity sensor, or an illuminance sensor.

According to an embodiment, the key input devices 203 and 204 may include the side key buttons 203 and 204 disposed on the side surface 210C of the housing 210. In another embodiment, the electronic device 200 may one or more of the aforementioned key input devices 203 and 204, and the key input devices 203 and 204 not included may be implemented in a different form, such as a soft key, on the display 220. The connector hole 209 may include another connector hole (not illustrated) for accommodating a connector (e.g., a USB connector) that transmits and receives power and/or data with an external electronic device and accommodating a connector that transmits and receives audio signals with an external electronic device. The electronic device 200 may further include, for example, a connector cover (not illustrated) that covers at least part of the connector hole 209 and blocks infiltration of external foreign matter into the connector hole 209.

According to an embodiment, the fastening members 250 and 260 may be detachably fastened to at least partial areas of the housing 210 by locking members 251 and 261. The fastening members 250 and 260 may include at least one of a fixing member 252, fixing member fastening holes 253, a band guide member 254, or a band fixing ring 255.

According to an embodiment, the fixing member 252 may be configured to fix the housing 210 and the fastening members 250 and 260 to a part (e.g., a wrist, an ankle, or the like) of the user's body. The fixing member fastening holes 253 may securely couple the housing 210 and the fastening members 250 and 260 to a part of the user's body, upon fastening by the fixing member 252. The band guide member 254 may be configured to restrict a movement range of the fixing member 252 when the fixing member 252 is fastened to one of the fixing member fastening holes 253. Accordingly, the fastening members 250 and 260 may be fastened around the part of the user's body in close contact with the part of the user's body. The band fixing ring 255 may restrict a movement range of the fastening members 250 and 260 in a state in which the fixing member 252 is fastened to one of the fixing member fastening holes 253.

Referring to FIG. 3, an electronic device 300 (e.g., the electronic device 101 or the electronic device 200) may include the front plate 201, the display 220, an antenna 350, a side bezel structure 310, a first printed circuit board 320 (e.g., a sensor circuit board), an RF coil 330, a support member 360 (e.g., a bracket), a battery 370, a second printed circuit board 380 (e.g., a main circuit board), a first back plate 393, a second back plate 394 (e.g., the back plate 207), and fastening members 395 and 397 (e.g., the fastening members 250 and 260). At least one of the components of the electronic device 300 may be the same as, or similar to, at least one of the components of the electronic device 200 of FIG. 2A or 2B, and repetitive descriptions will hereinafter be omitted.

According to an embodiment, the support member 360 may be disposed inside the electronic device 300 and may be connected with the side bezel structure 310, or may be integrally formed with the side bezel structure 310. The support member 360 may be formed of, for example, a metallic material and/or a nonmetallic (e.g., polymer) material. The display 220 may be coupled to one surface of the support member 360, and the second printed circuit board 380 may be coupled to an opposite surface of the support member 360. A processor (e.g., the processor 120), a memory (e.g., the memory 130), and/or an interface (e.g., the interface 177) may be mounted on the second printed circuit board 380. The processor may include, for example, at least one of a central processing unit, an application processor, a graphic processing unit (GPU), an application processor, a sensor processor, or a communication processor.

According to an embodiment, the memory may include, for example, a volatile memory or a nonvolatile memory. The interface may include, for example, a high definition multimedia interface (HDMI), a universal serial bus (USB) interface, an SD card interface, and/or an audio interface. The interface, for example, may electrically or physically connect the electronic device 300 with an external electronic device and may include a USB connector, an SD card/MMC connector, or an audio connector.

According to an embodiment, the battery 370 may supply power to at least one component of the electronic device 300. The battery 370 may include, for example, a primary cell that is not rechargeable, a secondary cell that is rechargeable, or a fuel cell. At least part of the battery 370, for example, may be disposed on substantially the same plane as the second printed circuit board 380. The battery 370 may be integrally disposed inside the electronic device 300, or may be disposed so as to be detachable from the electronic device 300.

According to an embodiment, the antenna 350 may be disposed between the display 220 and the support member 360. The antenna 350 may include, for example, a near field communication (NFC) antenna, a wireless charging antenna, and/or a magnetic secure transmission (MST) antenna. The antenna 350, for example, may perform short-range communication with an external device, or may wirelessly transmit and receive power utilized for charging, and may transmit a magnetism-based signal including a short-range communication signal or payment data. In another embodiment, an antenna structure may be formed by part of the side bezel structure 310 and/or part of the support member 360, or a combination thereof.

According to an embodiment, the first printed circuit board 320 may be located between the second printed circuit board 380 and the first back plate 393. For example, various sensors (e.g., at least one of a gesture sensor, a gyro sensor, an atmospheric pressure sensor, a magnetic sensor, an acceleration sensor, a grip sensor, a color sensor, an infrared (IR) sensor, a biosensor, a temperature sensor, a humidity sensor, or an illuminance sensor) may be mounted on the first printed circuit board 320. The first printed circuit board 320 may include a magnetic member (not illustrated) that fixes a part of the various sensors to the first printed circuit board 320.

According to an embodiment, a position sensor (not illustrated) may be mounted on the second printed circuit board 380. For example, the position sensor may detect a change in the magnetic force of the magnetic member when the electronic device 300 performs a wireless charging operation with an external electronic device. The processor (e.g., the processor 120) may obtain position information of the electronic device 300 for wireless charging alignment, based on the change in the magnetic force of the magnetic member. The processor may display, through the display 220, a graphic depicting a movement direction in which the electronic device 300 is to be moved to generate the proper alignment for wireless charging, based on the position information.

According to an embodiment, the RF coil 330 may be located between the first back plate 393 and the second back plate 394. For example, the RF coil 330 may be configured to receive a wireless charging signal from the outside. Alternatively, the RF coil 330 may be configured to transmit a wireless charging signal to the outside.

Figure 4:
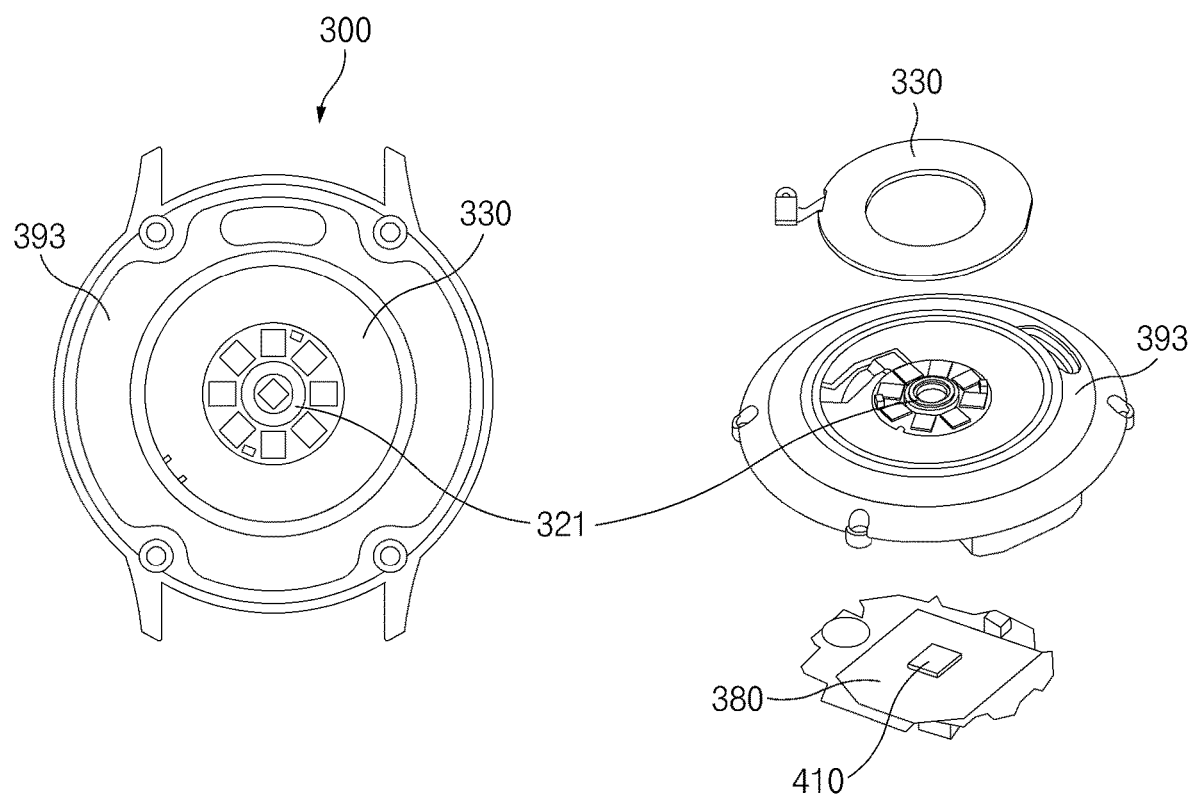
FIG. 4 is a view illustrating magnetic members and a position sensor for wireless charging alignment in the electronic device according to the embodiment.
Figure 5:
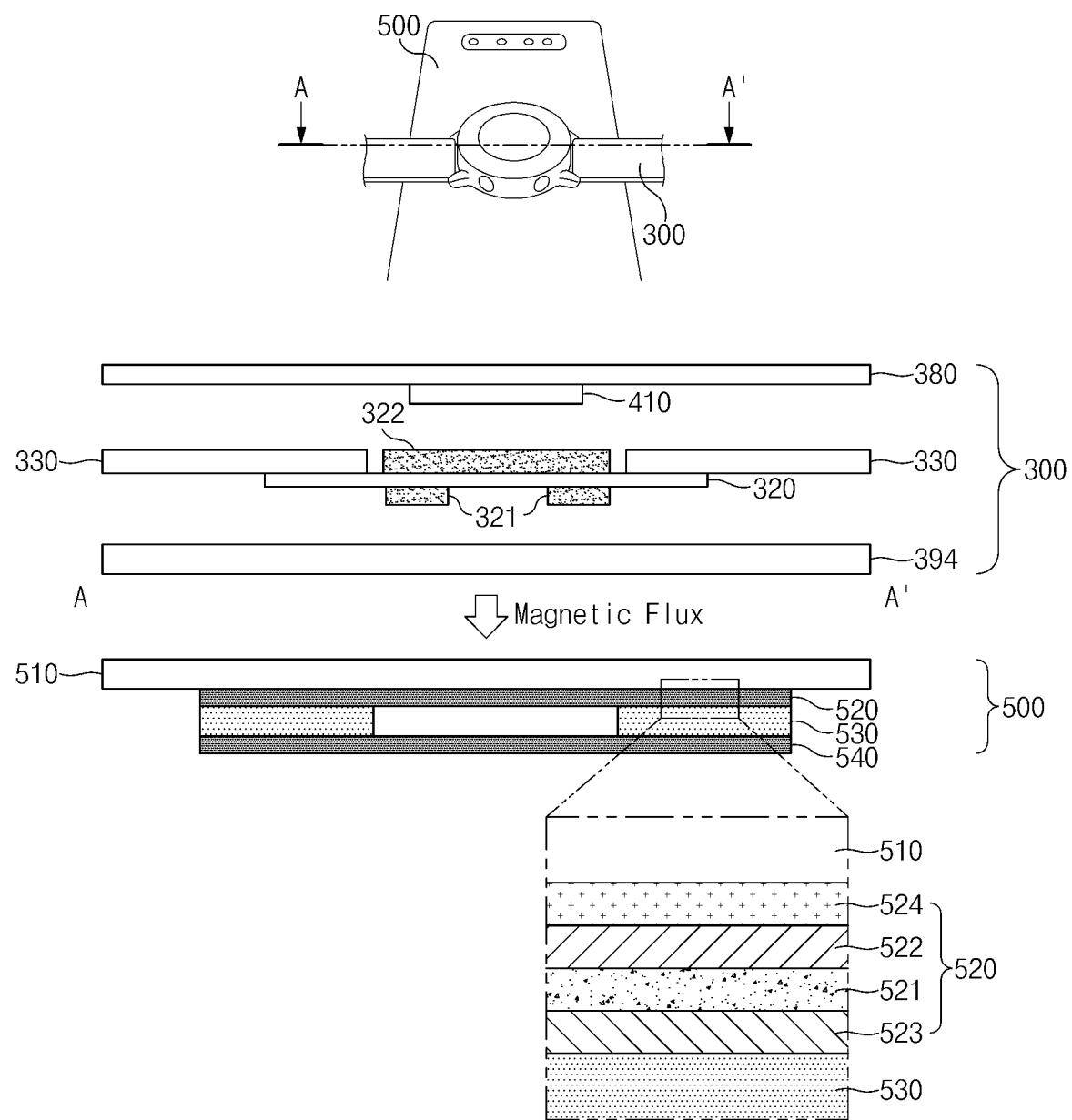
FIG. 5 is a sectional view of the electronic device and an external electronic device taken along line A-A', where the electronic device and the external electronic device are aligned with each other for wireless charging.

FIG. 4 is a view illustrating magnetic members and a position sensor for wireless charging alignment in the electronic device according to the embodiment. FIG. 5 is a sectional view of the electronic device and an external electronic device taken along line A-A', where the electronic device and the external electronic device are aligned with each other for wireless charging.

Referring to FIGS. 4 and 5, the electronic device 300 may include the magnetic members 321 and 322 and the position sensor 410. The magnetic members 321 and 322 may be disposed on the first printed circuit board 320. For example, the magnetic members 321 and 322 may fix at least one component (e.g., a part of the various sensors) disposed on the first printed circuit board 320 to the first printed circuit board 320. Surfaces of the first magnetic member 321 and the second magnetic member 322 that have different polarities may face each other and may be fixed to specific positions on the first printed circuit board 320. The first magnetic member 321 may be disposed on one surface of the first printed circuit board 320, and the second magnetic member 322 may be disposed on an opposite surface of the first printed circuit board 320. The position sensor 410 may be disposed on the second printed circuit board 380. In another example, the electronic device 300 may include a flexible printed circuit board (FPCB) (not illustrated) that is connected to the second printed circuit board 380. The position sensor 410 may be disposed on the FPCB (not illustrated). For example, the position sensor 410 may be disposed on one surface of the second printed circuit board 380 to correspond to the magnetic members 321 and 322. When viewed in a direction perpendicular to the one surface of the second printed circuit board 380, the position sensor 410 may be disposed over the magnetic members 321 and 322 so as to be aligned with the magnetic members 321 and 322. For example, the position sensor 410 may include a Hall sensor that measures a change in the magnetic force of the magnetic member 321 or 322. In another example, the electronic device 300 may include a plurality of magnetic members disposed in different positions inside the electronic device 300. The electronic device 300 may include a plurality of Hall sensors disposed to correspond to the plurality of magnetic members.

According to an embodiment, the electronic device 300 may exchange a wireless charging signal with the external electronic device 500. For example, the electronic device 300 may perform a wireless charging operation when the RF coil 330 of the electronic device 300 and an RF coil 530 of the external electronic device 500 are aligned with each other. The electronic device 300 may receive power from the external electronic device 500 through the wireless charging operation. When the center of the RF coil 330 is accurately aligned with the center of the RF coil 530, the electronic device 300 may effectively receive a prespecified amount of power. When the center of the RF coil 330 is not accurately aligned with the center of the RF coil 530, the electronic device 300 may not effectively receive the prespecified amount of power, or the wireless charging operation may be terminated.

According to an embodiment, shielding sheets 520 and 540 may be attached to the RF coil 530 of the external electronic device 500. For example, the first shielding sheet 520 may include a plurality of layers. The first shielding sheet 520 may include a magnetism change material layer 521, a first adhesive layer 522, a second adhesive layer 523, or a cover layer 524. The magnetism change material layer 521 may include a magnetism change material (e.g., metal) that is able to change the magnetic force of the magnetic member 321 or 322 in response to access of the magnetic member 321 or 322. According to certain embodiments, the external electronic device 500 may include various power transmitting devices. For example, the external electronic device 500 may include a notebook computer, a smart phone, a wireless charging pad, or a portable auxiliary battery.

According to an embodiment, the first adhesive layer 522 may be disposed between the RF coil 530 and the magnetism change material layer 521. For example, the first adhesive layer 522 may be disposed on one surface (e.g., a surface facing toward the RF coil 530) of the first shielding sheet

520. The first adhesive layer 522 may attach the first shielding sheet 520 (or, the magnetism change material layer 521) to the RF coil 530. The second adhesive layer 523 may be disposed between the magnetism change material layer 521 and the cover layer 524. For example, the second adhesive layer 523 may attach the cover layer 524 to the magnetism change material layer 521. The cover layer 524 may protect the magnetism change material layer 521 or the RF coil 530 from external hazards. In FIG. 5, the cover layer 524 (or, the first shielding sheet 520) is illustrated as making contact with a plate 510 (e.g., a back plate) of the external electronic device 500. However, the cover layer 524 may be disposed to be spaced apart from the plate 510 by a specific interval. According to certain embodiments, the second shielding sheet 540 may include a structure that is the same as or similar to that of the first shielding sheet 520. According to certain embodiments, the first shielding sheet 520 may be disposed on one surface of the RF coil 530. The second shielding sheet 540 may be disposed on an opposite surface of the RF coil 530.

According to an embodiment, the magnetism change material layer 521 may include portions having different magnetic permeabilities. For example, the magnetic force of the magnetic member 321 or 322 may be determined based on the magnetic permeability of the magnetism change material layer 521. When the magnetic permeability of the magnetism change material layer 521 is partially changed, the magnetic force of the magnetic member 321 or 322 may be changed based on the changed magnetic permeability. The position sensor 410 may sense a change in the magnetic force of the magnetic member 321 or 322 and may obtain position information of the electronic device 300 (or, the processor of the electronic device 300), based on the magnetic force change of the magnetic member 321 or 322. The position information may include an alignment state of the RF coil 330 and the RF coil 530. For example, when the center of the RF coil 330 and the center of the RF coil 530 are accurately aligned with each other, the position sensor 410 may measure the highest magnetic force value of the magnetic member 321 or 322. An alignment position determination method will be described below in detail with reference to FIGS. 6 and 7.

Figure 6:
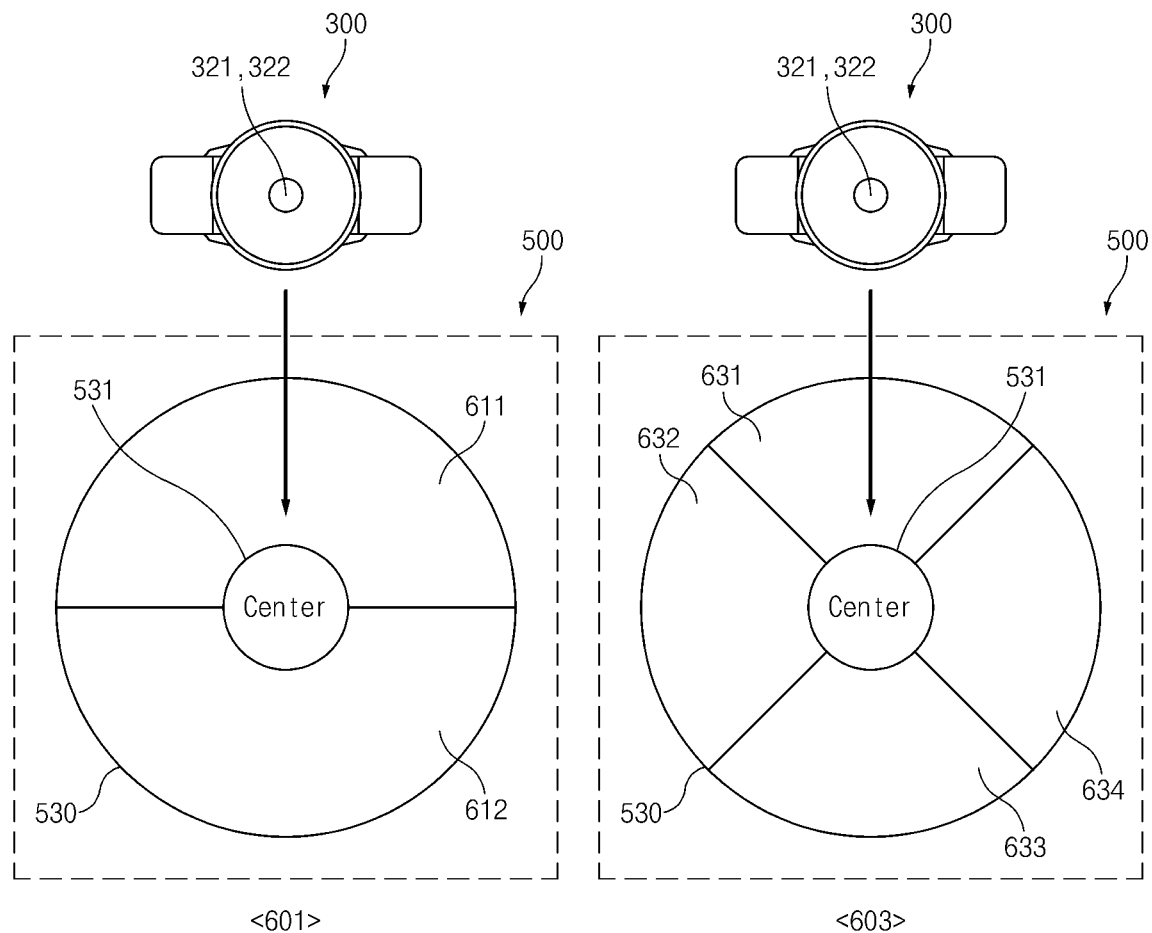
FIG. 6 is a view illustrating a wireless charging alignment position determination method of the electronic device according to an embodiment.
Figure 7:
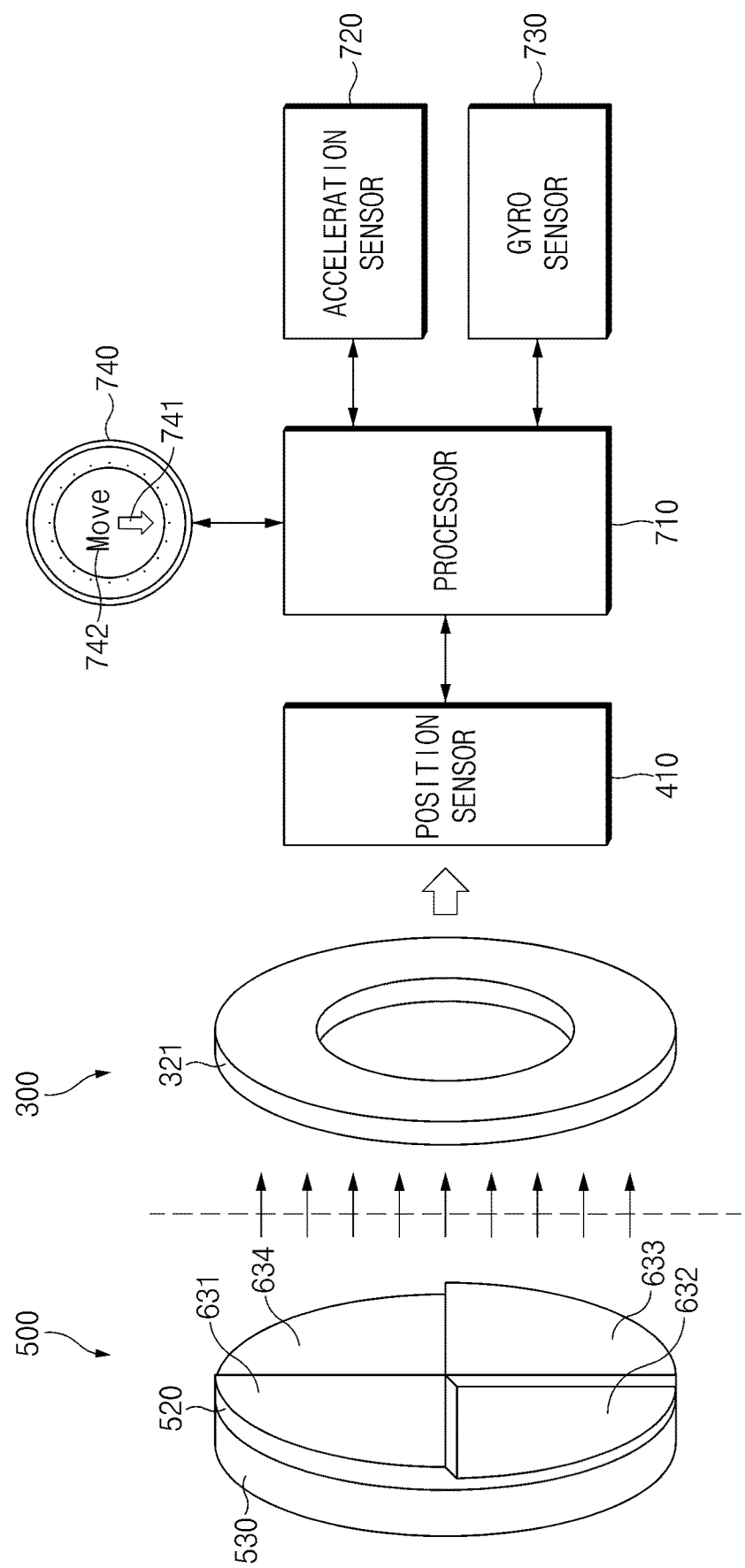
FIG. 7 is a view illustrating a wireless charging alignment display method of the electronic device according to an embodiment.

FIG. 6 is a view illustrating a wireless charging alignment position determination method of the electronic device according to an embodiment. FIG. 7 is a view illustrating a wireless charging alignment display method of the electronic device according to an embodiment.

Referring to FIGS. 6 and 7, the first shielding sheet 520 (or, the second shielding sheet 540) attached to the RF coil 530 of the external electronic device 500 may include at least two portions having different magnetic permeabilities. For example, in a first case 601 of FIG. 6, the first shielding sheet 520 (or, the second shielding sheet 540) may include portion 1-1 611 and portion 1-2 612 that have different magnetic permeabilities. For example, in a second case 603 of FIG. 6, the first shielding sheet 520 (or, the second shielding sheet 540) may include portion 2-1 631, portion 2-2 632, portion 2-3 633, and portion 2-4 634 that have different magnetic permeabilities. The first case 601 and the second case 603 are illustrative, and the first shielding sheet 520 (or, the second shielding sheet 540) may include a plurality of portions having different magnetic permeabilities.

According to an embodiment, the electronic device 300 may include a processor 710 (e.g., the processor 120), an inertial sensor (e.g., an acceleration sensor 720 or a gyro sensor 730), a display 740 (e.g., the display device 160), and the position sensor 410. For example, the processor 710 may control overall operation of the electronic device 300. The processor 710 may be operatively connected with the inertial sensor, the display 740, and the position sensor 410.

According to an embodiment, the processor 710 may measure the magnetic force of the first magnetic member 321 (or, the second magnetic member 322) through the position sensor 410. For example, the magnetic force of the first magnetic member 321 (or, the second magnetic member 322) may be determined based on the position of the first magnetic member 321 (or, the second magnetic member 322) over the first shielding sheet 520 (or, the second shielding sheet 540). Furthermore, the magnetic force of the first magnetic member 321 (or, the second magnetic member 322) may be determined based on the magnetic permeability of the first shielding sheet 520 (or, the second shielding sheet 540). The processor 710 may store, in a memory (e.g., the memory 130), a position-magnetic force table (e.g., a lookup table or a graph) regarding magnetic force values depending on positions of the first magnetic member 321 (or, the second magnetic member 322) over the first shielding sheet 520 (or, the second shielding sheet 540). The processor 710 may determine the position of the first magnetic member 321 (or, the second magnetic member 322) corresponding to a measured magnetic force value, based on the position-magnetic force table.

According to an embodiment, in the first case 601 of FIG. 6, portion 1-1 611 of the first shielding sheet 520 (or, the second shielding sheet 540) may have a first magnetic permeability, and portion 1-2 612 may have a second magnetic permeability. For example, in a wireless charging situation, the electronic device 300 may be moved in one direction from one point of the external electronic device 500 by a user. The processor 710 may detect a moving direction of the electronic device 300 through the inertial sensor. The processor 710 may measure a change in the magnetic force of the first magnetic member 321 (or, the second magnetic member 322) through the position sensor 410, based on the moving direction of the electronic device 300.

For example, if the magnetic force of the first magnetic member 321 (or, the second magnetic member 322) is increased when the electronic device 300 is moved in a first direction, the processor 710 may determine that the center of the first magnetic member 321 (or, the second magnetic member 322) moves toward the center 531 of the RF coil 530. At this time, the processor 710 may display, on the display 740, an object (e.g., a direction indicating object 741 (e.g., an arrow) or a text object 742 (e.g., Move or OK)) that indicates the first direction. If the magnetic force of the first magnetic member 321 (or, the second magnetic member 322) is decreased when the electronic device 300 is moved in a second direction, the processor 710 may determine that the center of the first magnetic member 321 (or, the second magnetic member 322) moves away from the center 531 of the RF coil 530. At this time, the processor 710 may display, on the display 740, an object (e.g., the direction indicating object 741 or the text object 742) that indicates a third direction opposite to the second direction.

Furthermore, based on a measured magnetic force value (e.g., by comparing the measured magnetic force value with the position-magnetic force table), the processor 710 may determine whether the center of the first magnetic member 321 (or, the second magnetic member 322) is located over portion 1-1 611 or portion 1-2 612. Accordingly, the processor 710 may determine a direction in which the electronic device 300 has to be moved for wireless charging alignment.

According to certain embodiments, the processor 710 may determine the position of the electronic device 300 by measuring the rate of change of the magnetic force of the first magnetic member 321 (or, the second magnetic member 322). For example, when the electronic device 300 moves over portion 1-1 611, the magnetic force of the first magnetic member 321 (or, the second magnetic member 322) may vary to have a first slope. When the electronic device 300 moves over portion 1-2 612, the magnetic force of the first magnetic member 321 (or, the second magnetic member 322) may vary to have a second slope. The processor 710 may measure a change in the magnetic force of the first magnetic member 321 (or, the second magnetic member 322) through the position sensor 410 and may measure the slope of the magnetic force change. When the slope of the magnetic force change is the same as or similar to the first slope, the processor 710 may determine that the electronic device 300 is located over portion 1-1 611. Alternatively, when the slope of the magnetic force change is the same as or similar to the second slope, the processor 710 may determine that the electronic device 300 is located over portion 1-2 612. Information about the first slope and the second slope may be stored in the memory (e.g., the memory 130) in advance.

According to an embodiment, in the second case 603 of FIG. 6, portion 2-1 631 of the first shielding sheet 520 (or, the second shielding sheet 540) may have a first magnetic permeability, portion 2-2 632 may have a second magnetic permeability, portion 2-3 633 may have a third magnetic permeability, and portion 2-4 634 may have a fourth magnetic permeability. For example, the processor 710 may determine the position and a moving direction of the first magnetic member 321 (or, the second magnetic member 322) by a method that is the same as or similar to that in the first case 601. Furthermore, when a magnetic-permeability difference between portions of the first shielding sheet 520 (or, the second shielding sheet 540) is more finely divided than in the first case 601, the processor 710 may more accurately determine the position and the moving direction of the first magnetic member 321 (or, the second magnetic member 322) than in the first case 601.

According to an embodiment, the first shielding sheet 520 (or, the second shielding sheet 540) may be configured in various ways to have a difference in magnetic permeability between portions thereof. For example, a magnetism change material layer (e.g., the magnetism change material layer 521) included in the first shielding sheet 520 (or, the second shielding sheet 540) may be formed to include portions having different thicknesses. Alternatively, the composition ratios of constituent materials of the magnetism change material layer may be differently set for respective portions. For example, the magnetism change material layer may be formed of an amorphous alloy of iron (Fe) and cobalt (Co). In this case, the magnetism change material layer may be formed such that the composition ratios of iron (Fe) and cobalt (Co) are different for respective portions.

According to an embodiment, the processor 710 may display, through the display 740, a movement direction in which the electronic device 300 is to move for wireless charging alignment. For example, the processor 710 may display the direction indicating object 741 (e.g., an arrow) or the text object 742 (e.g., Move or OK) on the display 740, based on the position and the moving direction of the first magnetic member 321 (or, the second magnetic member 322).

According to certain embodiments, the electronic device 300 is illustrated as a wearable electronic device in FIGS. 4, 5, 6, and 7. However, this is illustrative, and the electronic device 300 may include various portable electronic devices (e.g., a smart phone, wireless earphones, an earphone case, or a portable auxiliary battery) that can be wirelessly charged. For example, the wireless charging alignment display method, which has been described above with reference to FIGS. 4, 5, 6, and 7, may be applied between various power transmitting devices (e.g., a notebook computer, a smart phone, a wireless charging pad, or a portable auxiliary battery) and various power receiving devices (e.g., a smart phone, wireless earphones, an earphone case, or a portable auxiliary battery).

According to certain embodiments, an electronic device (e.g., the electronic device 101 or 300) for performing wireless charging with an external electronic device (e.g., the electronic device 102 or the external electronic device 500) may include a magnetic member (e.g., the magnetic member 321 or 322), a position sensor (e.g., the position sensor 410) that senses a magnetic force change of the magnetic member, a display (e.g., the display device 160 or the display 220), and a processor (e.g., the processor 120) operatively connected with the position sensor and the display. When the magnetic member approaches the external electronic device, the processor may detect the magnetic force change of the magnetic member measured through the position sensor and may display, on the display, a movement direction in which the magnetic member is to move for wireless charging alignment, based on the magnetic force change.

According to certain embodiments, the electronic device may further include an inertial sensor (e.g., the acceleration sensor 720 or the gyro sensor 730), and the processor may obtain information about a moving direction of the magnetic member through the inertial sensor and may display, on the display, an object that indicates a first direction, when a magnetic force of the magnetic member is increased by a movement of the magnetic member in the first direction.

According to certain embodiments, the processor may display, on the display, an object that indicates a third direction opposite to a second direction, when the magnetic force of the magnetic member is decreased by a movement of the magnetic member in the second direction different from the first direction.

According to certain embodiments, the electronic device may further include a first RF coil (e.g., the RF coil 330) that transmits and receives a wireless charging signal. The external electronic device may include a second RF coil (e.g., the RF coil 530) that transmits and receives the wireless charging signal with the first RF coil and a shielding sheet (e.g., the shielding sheet 520 or 540) that is disposed on one surface of the second RF coil and that includes portions having different magnetic permeabilities. The processor may obtain, through the position sensor, the magnetic force change of the magnetic member changed by the shielding sheet.

According to certain embodiments, the magnetic member may be disposed to be aligned with the center of the first RF coil, and the position sensor may measure a highest magnetic force value when the magnetic member and the center of the second RF coil are aligned with each other.

According to certain embodiments, the position sensor may be disposed to be aligned with the magnetic member.

According to certain embodiments, the shielding sheet may include at least two portions (e.g., portion 1-1 611 and portion 1-2 612) that have different magnetic permeabilities. The position sensor may measure a first magnetic force change of the magnetic member when the magnetic member moves over a first portion of the shielding sheet. The position sensor may measure a second magnetic force change of the magnetic member when the magnetic member moves over a second portion of the shielding sheet, the second portion having a different magnetic permeability from the first portion. A slope of the first magnetic force change may be measured to be different from a slope of the second magnetic force change.

According to certain embodiments, the shielding sheet may include a first portion (e.g., portion 2-1 631) having a first magnetic permeability, a second portion (e.g., portion 2-2 632) having a second magnetic permeability, a third portion (e.g., portion 2-3 633) having a third magnetic permeability, and a fourth portion (e.g., portion 2-4 634) having a fourth magnetic permeability. The position sensor may measure a first magnetic force change when the magnetic member moves over the first portion, may measure a second magnetic force change when the magnetic member moves over the second portion, may measure a third magnetic force change when the magnetic member moves over the third portion, and may measure a fourth magnetic force change when the magnetic member moves over the fourth portion.

According to certain embodiments, the processor may determine one of the first portion, the second portion, the third portion, or the fourth portion to be a position of the magnetic member, based on the first magnetic force change, the second magnetic force change, the third magnetic force change, and the fourth magnetic force change.

According to certain embodiments, the electronic device may include a memory (e.g., the memory 130). The processor may store, in advance, a position-magnetic force table including first magnetic force change, the second magnetic force change, the third magnetic force change, and the fourth magnetic force change in the memory.

According to certain embodiments, the processor may determine the position of the magnetic member by comparing the magnetic force change of the magnetic member measured through the position sensor with the position-magnetic force table and may display, on the display, a movement direction in which the magnetic member is to move to align the center of the first RF coil and the center of the second RF coil, based on the position of the magnetic member.

According to certain embodiments, an electronic device (e.g., the electronic device 102 or the external electronic device 500) for wirelessly transmitting power to an external electronic device (e.g., the electronic device 101 or 300) through a wireless charging signal may include an RF coil (e.g., the RF coil 530) that transmits the wireless charging signal, a shielding sheet (e.g., the shielding sheet 520 or 540) disposed on one surface of the RF coil, and a processor (e.g., the processor 120) that generates the wireless charging signal and transmits the wireless charging signal through the RF coil. The shielding sheet may include at least two portions (e.g., portion 1-1 611 and portion 1-2 612) that have different magnetic permeabilities, and a magnetic member included in the external electronic device may have different magnetic force values when approaching the at least two portions.

According to certain embodiments, the shielding sheet may include a magnetism change material layer (e.g., the magnetism change material layer 521), and a magnetic force value of the magnetic member may be determined based on a magnetic permeability of the magnetism change material layer.

According to certain embodiments, the shielding sheet may include a first portion and a second portion, and the magnetism change material layer may have different thicknesses in the first portion and the second portion.

According to certain embodiments, the shielding sheet may include a first portion and a second portion, the magnetism change material layer may be formed of an alloy of a plurality of metals, and composition ratios of the plurality of metals included in the magnetism change material layer may be differently set in the first portion and the second portion.

According to the embodiments of the disclosure, the electronic device may display a movement direction in which the electronic device is to move for wireless charging alignment when performing wireless charging with an external electronic device.

In addition, the disclosure may provide various effects that are directly or indirectly recognized.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to certain embodiments thereof, it will be understood by those skilled in the art that various changes in form and details may be made therein without departing from disclosure as defined by the appended claims and their equivalents.

What is claimed is:

1. An electronic device, comprising:
   a magnetic member;
   a first RF coil configured to transmit and receive a wireless charging signal,
   a position sensor configured to detect a change in a magnetic force of the magnetic member;
   a display; and
   a processor operatively connected with the position sensor and the display,
   wherein the processor is configured to:
   when the magnetic member approaches an external electronic device, detect the change in the magnetic force of the magnetic member through the position sensor; and
   based on the detected change, display, on the display, a graphic indicating a direction in which the magnetic member is to be moved to align the electronic device with an external device for wireless charging,
   wherein the external electronic device includes a second RF coil configured to transmit and receive the wireless charging signal with the first RF coil, and a shielding sheet disposed on one surface of the second RF coil, the shielding sheet including portions having different magnetic permeabilities, and
   wherein the processor is configured to detect, through the position sensor, the change in the magnetic force as changed by proximity of the shielding sheet.

2. The electronic device of claim 1, further comprising:
   an inertial sensor,
   wherein the processor is configured to:
   detect a direction of movement of the magnetic member through the inertial sensor; and
   when detecting an increase in the magnetic force is via the position sensor with movement of the magnetic member in a first direction via the inertial sensor, display the graphic to indicate the magnetic member is to be moved in the first direction.

3. The electronic device of claim 2, wherein the processor is configured to:
   when detecting a decrease in the magnetic force is via the position sensor with movement of the magnetic member in a second direction via the inertial sensor, display, on the display, the graphic to indicate the magnetic member is to be moved in a third direction opposite to a second direction.

4. The electronic device of claim 1, wherein the magnetic member is aligned with a center of the first RF coil, and
   wherein the magnetic force of the magnetic member reaches a maximum value when the magnetic member and a center of the second RF coil are aligned.

5. The electronic device of claim 1, wherein the position sensor is aligned with the magnetic member.

6. The electronic device of claim 1, wherein the shielding sheet includes at a first portion and a second portion, each having different magnetic permeabilities,
   wherein the position sensor detects a first magnetic force change of the magnetic member when the magnetic member moves over a first portion of the shielding sheet,
   wherein the position sensor detects a second magnetic force change of the magnetic member when the magnetic member moves over a second portion of the shielding sheet, and
   wherein a slope of the first magnetic force change is different from a slope of the second magnetic force change.

7. The electronic device of claim 1, wherein the shielding sheet includes a first portion having a first magnetic permeability, a second portion having a second magnetic permeability, a third portion having a third magnetic permeability, and a fourth portion having a fourth magnetic permeability, and
   wherein the position sensor:
   measures a first magnetic force change when the magnetic member moves over the first portion;
   measures a second magnetic force change when the magnetic member moves over the second portion;

measures a third magnetic force change when the magnetic member moves over the third portion; and measures a fourth magnetic force change when the magnetic member moves over the fourth portion.

8. The electronic device of claim 7, wherein the processor is configured to: determine whether the magnetic member is disposed at the first portion, the second portion, the third portion, or the fourth portion based on detecting, by the position sensor, one of the first magnetic force change, the second magnetic force change, the third magnetic force change, and the fourth magnetic force change.

9. The electronic device of claim 8, further comprising:
a memory,
wherein the processor is configured to store, in the memory, a position-magnetic force table including the first magnetic force change, the second magnetic force change, the third magnetic force change, and the fourth magnetic force change.

10. The electronic device of claim 9, wherein the processor is configured to:
determine a present position of the magnetic member by comparing the change in magnetic force of the magnetic member detected through the position sensor with the position-magnetic force table, wherein the direction indicated by the graphic in which the magnetic member is to be moved aligns the center of the first RF coil and the center of the second RF coil, respective to the present position of the magnetic member.

11. An electronic device, comprising:
an RF coil configured to transmit a wireless charging signal;
a shielding sheet disposed on one surface of the RF coil; and
a processor configured to:
control the RF coil to generate the wireless charging signal and transmit the wireless charging signal,
wherein the shielding sheet includes at least two portions having different magnetic permeabilities, and
wherein a magnetic member included in an external electronic device is changed in magnetic force values when approaching the at least two portions.

12. The electronic device of claim 11, wherein the shielding sheet includes a magnetism change material layer, and
wherein a magnetic force value of the magnetic member is determined based on a magnetic permeability of the magnetism change material layer.

13. The electronic device of claim 12, wherein the shielding sheet includes a first portion and a second portion, and
wherein the magnetism change material layer has a different thickness between the first portion and the second portion.

14. The electronic device of claim 12, wherein the shielding sheet includes a first portion and a second portion,
wherein the magnetism change material layer is formed of an alloy of a plurality of metals, and
wherein composition ratios of the plurality of metals included in the magnetism change material layer are different between the first portion and the second portion.

* * * * *